Sept. 13, 1966    J. W. HYNDMAN    3,272,064
LIGHT ATTENUATING OPTICAL DEVICE FOR VEHICLES
Filed Sept. 23, 1965    5 Sheets-Sheet 1

Inventor
Joseph W. Hyndman
Edwin E. Greigg
Attorney

Sept. 13, 1966     J. W. HYNDMAN     3,272,064
LIGHT ATTENUATING OPTICAL DEVICE FOR VEHICLES
Filed Sept. 23, 1965                                      5 Sheets-Sheet 2
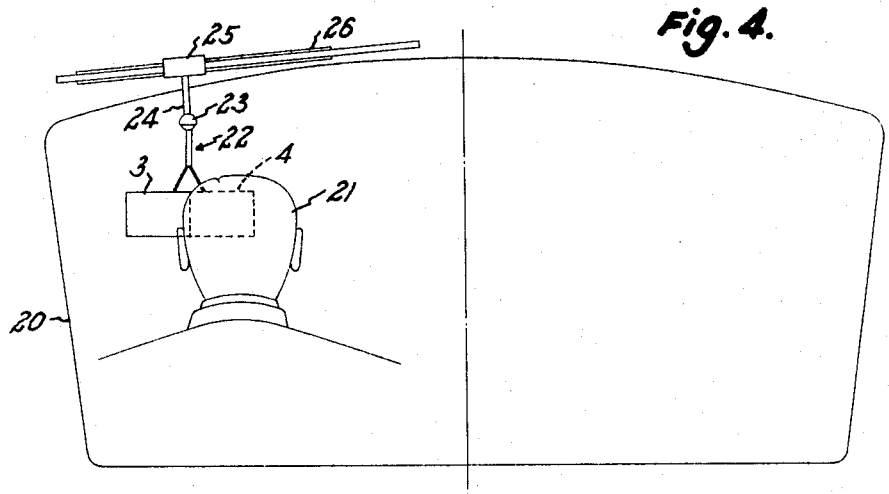
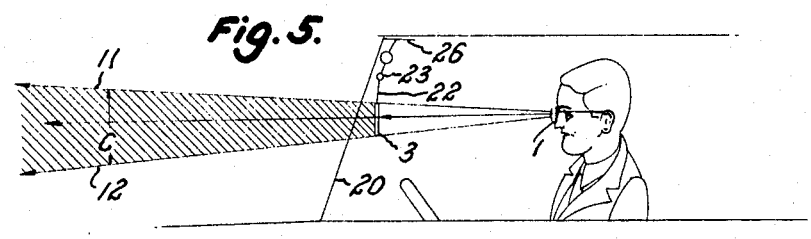
Fig. 6a.
Fig. 6b.
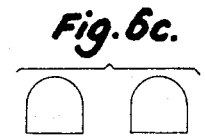
Fig. 6c.
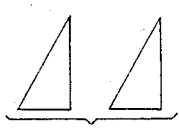
Fig. 6d.
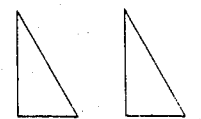
Fig. 6e.
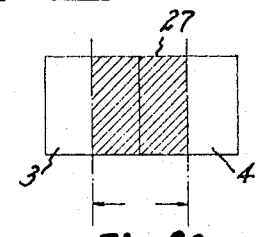
Fig. 6f.
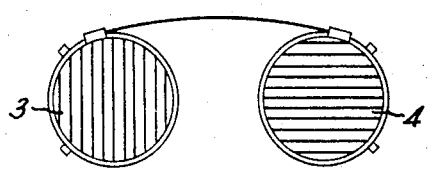
Fig. 7.
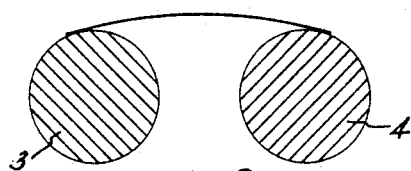
Fig. 8.
Inventor
Joseph W. Hyndman
By Edwin E. Greigg
Attorney Sept. 13, 1966  J. W. HYNDMAN  3,272,064
LIGHT ATTENUATING OPTICAL DEVICE FOR VEHICLES
Filed Sept. 23, 1965  5 Sheets-Sheet 4
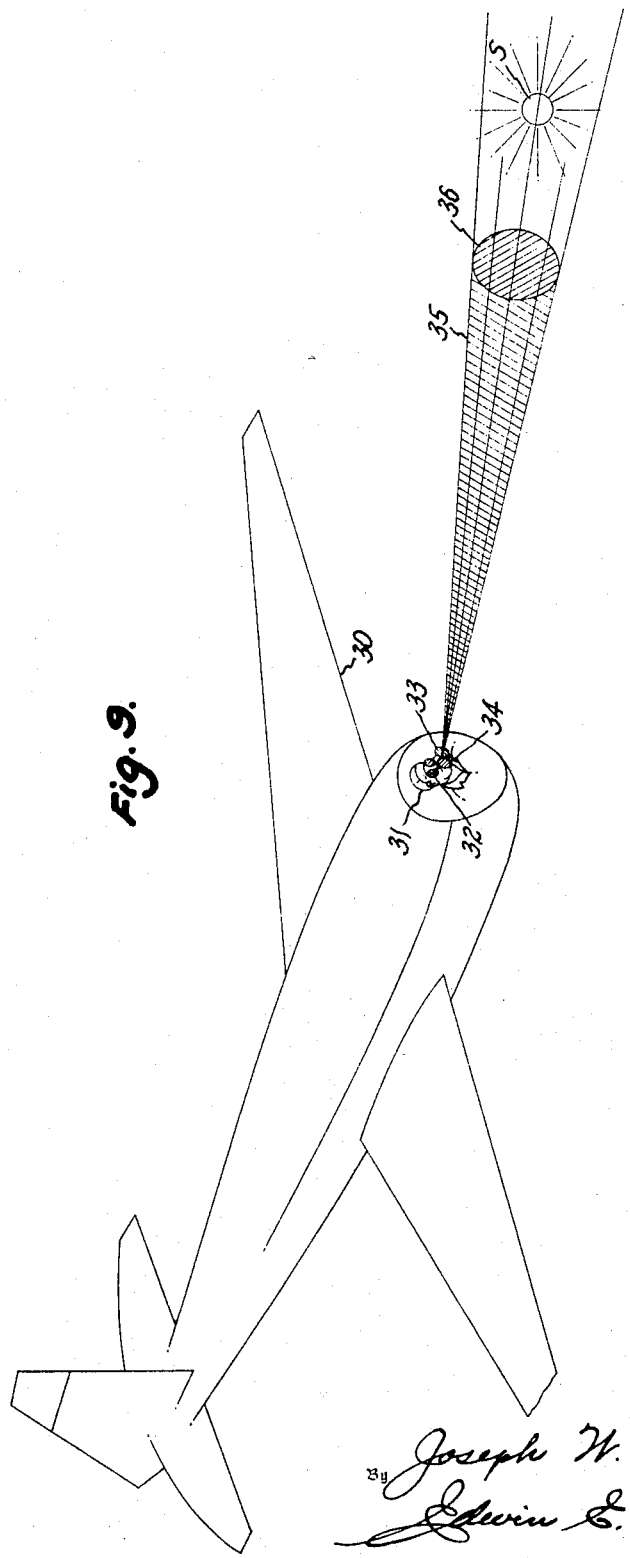

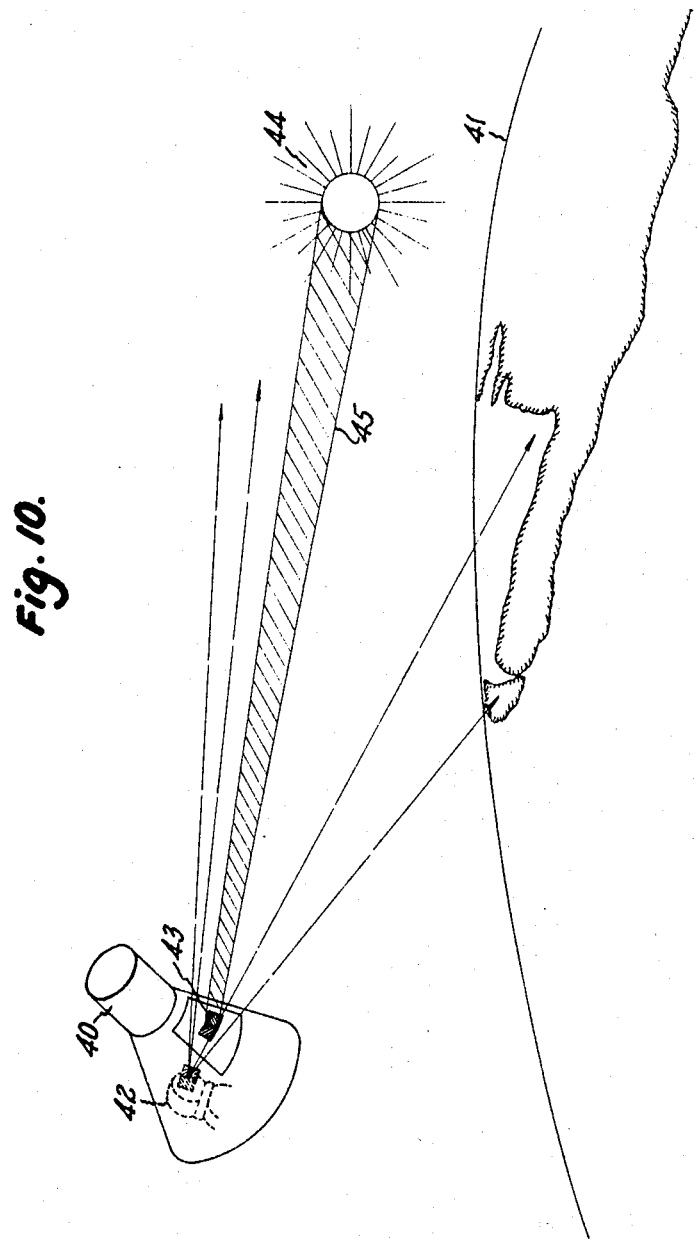

United States Patent Office 3,272,064
Patented Sept. 13, 1966

3,272,064
LIGHT ATTENUATING OPTICAL DEVICE
FOR VEHICLES
Joseph W. Hyndman, Denver, Colo., assignor to
C. W. MacMillan, Rock Island, Ill.
Filed Sept. 23, 1965, Ser. No. 495,753
3 Claims. (Cl. 88—1)

This is a continuation-in-part application of application Serial No. 138,484, filed September 15, 1961, now Patent No. 3,181,756 entitled, "Optical Device," of the same inventor, now abandoned.

This invention primarily relates to providing an improved attenuating means for controlling and dissipating the detrimental effect of light rays on the eyes of an operator of an automobile, generally caused at night by the headlights of another oncoming motor vehicle.

It may be regarded as common knowledge that, although substantially all automobiles, particularly the more modern ones, have as a part of their usual equipment a foot operated switch for enabling the driver to utilize either the high (distance light beams) or the low (city light beams), these are not always used conscientiously and with the best of judgment. Manufacturers have been improving automobiles in many respects and this improvement applies as well to the powerful light transmitting characteristics of the headlights thereof. As a consequence, many accidents have occurred on the highways after dark and no small number of these appear to have been attributable to instantaneous "light blindness" caused by the lights of an oncoming car.

In one embodiment of this invention it is contemplated that the light attenuating means may comprise screens having predetermined different optical characteristics which may be placed before the eyes and reversed eye-for-eye to obtain proper attenuation effect. Thus, within the scope of this concept, colored screens or those having polarizing characteristics may be utilized. It is well-known that certain commercially available film materials such as manufactured under the trademark "Polaroid" as well as others, polarize light passing through the film. Polarization is usually such that light passing through the film is caused to be plane-polarized through obstruction of all light rays not parallel to a given plane. Such an effect is produced by controlled arrangement of iodine or iodized crystals within the film. These films may be made with other patterns of polarization such as circular polarization, etc. However, it is considered to be within the scope of this concept that plane polarization will operate effectively and is preferable.

For sake of clarity, during the description of this invention the polarized medium in the spectacles which may take the form of snap-ons or otherwise, will be denoted as "lens screens" and those spaced in front of the wearer of the "lens screens" through which they observe the bright light, will be termed a "film screen."

Further, with respect to polarization, it is also well-known that if a film of plane-polarized material is held or placed before the eye (lens screen) with the polarizing plane at a fixed angle, for example vertical, and a second film is placed in front of the first film (film screen) so that its polarizing plane is at right angles to that of the lens screen, or horizontal thereto, the light passing through the film screen becomes polarized in a horizontal plane or planes, and thereupon striking the first mentioned lens screen becomes blocked since there is no light presented to the lens screen which is vibrating in planes parallel to the vertical planes of polarization. Therefore, it will be apparent, that should one or the other i.e., the lens screen or film screen be rotated substantially 90 degrees the planes of polarization thereof will become parallel with each other thereby permitting light to pass through to the eye. Furthermore, it will be readily appreciated that the eye can see through both the lens screen and the film screen in the second example, while in the first example, where the planes of polarization are at right angles to each other, no light will pass through to the eye and vision through the two films in this instance is substantially completely blocked.

It should be mentioned also that the natural passage of light through polarizing film is less than that which would be permitted to pass through or be transmitted by a clear glass or film. This is inherent in the material and, under some circumstances, may be undesirable. By way of example, a person with weakened eyes would prefer to have more visibility through the lens screen than that which would be required by a person with 20–20 vision. Moreover, a polarizing lens screen might be provided wherein the deposition of the polarizing crystals in the lens or film is reduced in such a way as to provide a less dense "light transmitting" medium. Such a film could be made by controlled scattering of the polarizing elements in the film. In an embodiment of this type the lens screen and film screen would permit some light to pass through to the eyes from the glare source. However, if approximately 30% of such light were allowed to pass, it, nevertheless, would be sufficiently reduced in brightness to be effective.

It is also noteworthy that the source of glare may be made visible to any predetermined value or degree by rotating the lens screens and/or the film screens to a suitable angle other than 90 degrees with respect to each other. This may be preferable in instances where it is not desired to block out the light source entirely.

Accordingly, with the benefit of this teaching, it is to be understood that a person who desires to be protected from light glare will wear a pair of spectacles each frame of which contains eye piece elements of polarized lens screens, the planes of polarization of which are substantially 90 degrees to the other lens provided in the spectacles. Then, to provide the desired effect, upon positioning in front of the wearer, mounted in any suitable manner (at substantially arm's length) will be another polarization means or filter which has its polarizing planes disposed substantially at right angles to each other, but reversed from the planes of polarization created by those of the wearer of the spectacles. In other words, the left eye vision of the person wearing the spectacles will be blocked from seeing through the left lens screen or filter spacedly arranged in front of the wearer and the right eye will be unable to see through the right lens screen or filter.

The two film screens, as previously mentioned, should be positioned substantially at arm's length from the wearer of the device. It is intended to be within the scope of this invention that the film screens may be formed as a part of and integrated into the windshield of a motor vehicle, or, it may be made as an attachment that is secured to the interior surface of the motor vehicle adjacent to or on the windshield. It is also contemplated that the shield may take the form of a glare screen that is pivotally attached adjacent to the roof or any other convenient supporting surface of an automobile as is well-known. It is also preferable that these two film screens be spaced with their centers at the approximate pupillary distance between the eyes, that is the center of the left film screen should be located at a distance from the right film screen center equal to the distance between the centers of the person's eyes.

The preferred embodiment of this invention is in the polarization means taught herein; however, favorable results also have been obtained by the use of complementary colored filters as a substitute for the aforementioned polarized screens and films.

From this understanding of the invention, it will become apparent, therefore, that the person whose eyes are being protected by wearing the device, may adjust the position of his head slightly to block out any objectional rays of light which may emanate from the concentrated source such as the headlights of an oncoming vehicle, search lights, or even the sun.

The invention will be more particularly described with reference to the accompanying drawings in which:

FIG. 4 is a view within the vehicle looking toward the windshield showing the head of a vehicle operator and a glare screen.

FIG. 5 is a side elevational view related in view in FIG. 4 and showing the operator of the automobile equipped with the lens screen and looking through the film screen.

FIGS. 6a through 6e are graphic representations of other embodiments comprising the film screen which may be positioned adjacent to the windshields.

FIG. 6f shows the preferred form of the invention wherein a rectangular configuration of the film screen is disclosed.

FIG. 7 represents a preferred form of lens attachment comprising "snap-ons" for spectacles.

FIG. 8 is a view similar to FIG. 7 in which the polarizing planes are at right angles to each other, but at 45 degrees to the vertical.

FIG. 9 is a schematic view of pilot equipped with the necessary screen lens means being placed before the operator for shielding the sun from his eyes.

FIG. 10 is a schematic view of an astronaut equipped with the lens screen and shown seated in a space capsule, the window of which is provided with the film screen.

Figure 1:
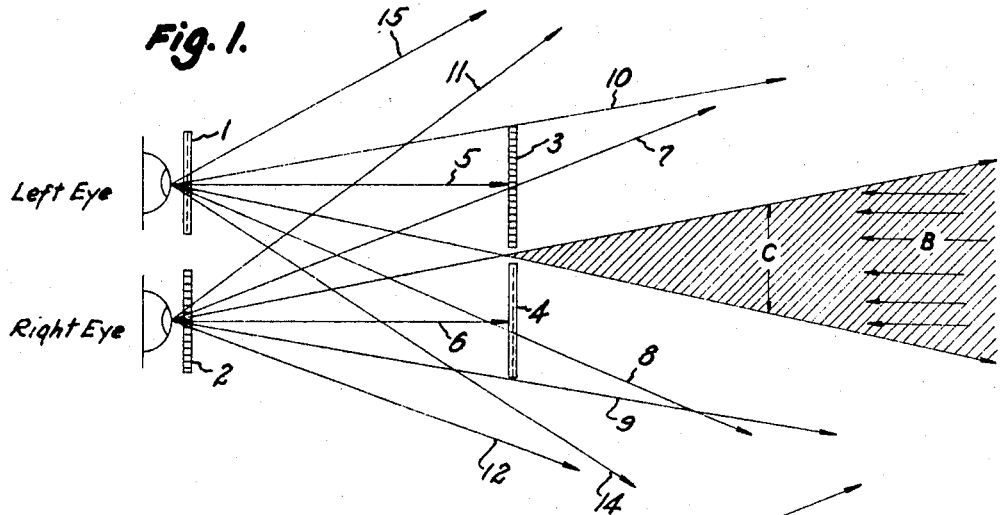
FIG. 1 is a diagrammatic representation of elements constituting the invention.
Figure 2:
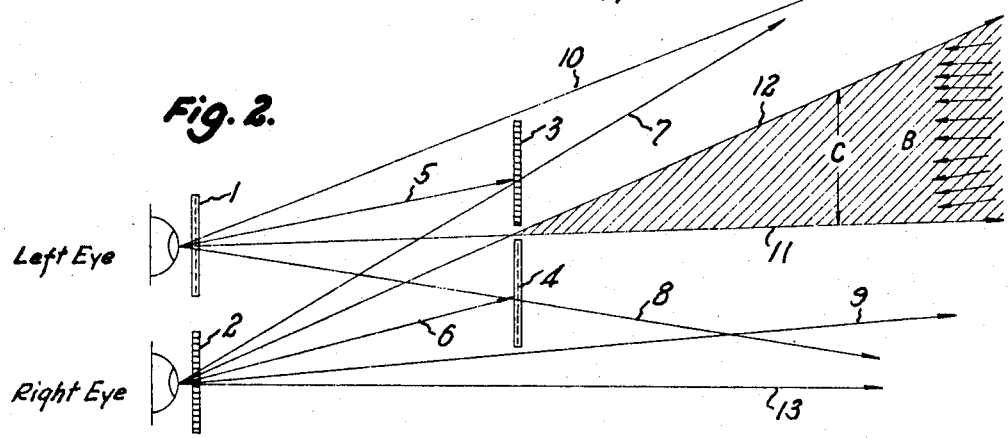
FIG. 2 is a diagrammatic representation of the elements adjusted for use with a conventional left hand vehicle drive.
Figure 3:
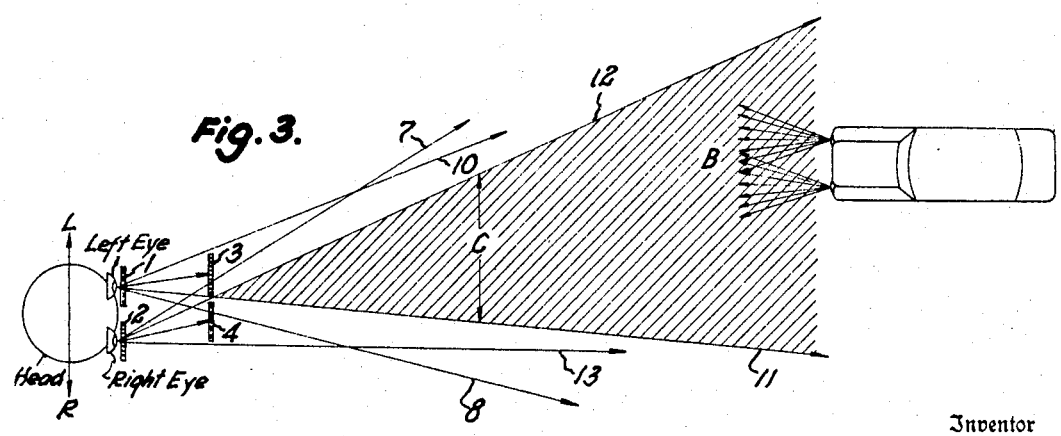
FIG. 3 is a diagrammatic representation of the elements as shown in FIG. 2 in which is also shown an oncoming vehicle with its headlights in operation.

With reference to the details of operation, as best shown diagrammatically in FIGS. 1, 2 and 3 of the drawings, the left eye as well as the right eye are indicated as having the polarized means or eye piece elements 1 and 2, respectively, positioned in front thereof. It is to be noted that a polarizing filter element 3 is positioned in the line of vision of the left eye and that a comparable polarizing filter element 4 is positioned in the line of vision of the right eye. From an examination of all of the figures of this sheet of drawings it will be observed that the polarizing planes of eye piece element 1 and filter 3 are substantially at right angles to each other. This same arrangement is also true of eye piece elements 2 and filter 4. At this time, it should be pointed out that throughout the discussion of this disclosure the cross-hatching shown diagrammatically in the form of a cone and indicated at C will be referred to as "the cone of control." The cone of control is intended to indicate light rays or beams B which are directed toward the person's eyes from any light source and which will be blocked or intercepted through the angle indicated at B by means of the several lens screens and film screens, previously described.

With further reference to FIGS. 1-3, the left eye is permitted to see through eye piece element 1 on the line 5, but not through filter 3, since the plane of polarization of filter 3 is at right angles to that of eye piece element 1. At the same time the right eye, which is looking in the direction of arrow 6, is permitted to see through eye piece element 2, but not through filter 4 because eye piece element 2 and filter 4 are also disposed at right angles to each other. However, with the benefit of peripheral vision the left eye is permitted to see through the filter 4 and at the same time the right eye is permitted to see through the filter 3, as indicated by arrows 8 and 7, respectively. Thus, it will be readily appreciated from this that vision is totally obstructed only through the cone of control area indicated in the angle C. With more detailed reference to FIG. 1, the arrows 9, 11 and 12 are used to indicate general unobstructed vision coverage for the right eye outside of the filters 3 and 4, respectively, while at the same time the arrows 10, 14 and 15 show similar general unobstructed direction of vision for the left eye.

Although the problem of overcoming glare from concentrated light rays has long been recognized, for there are many patents that disclose ways in which this is alleged to have been eliminated, no one has been successful in fully defeating or overcoming the problem. Only by the system herein disclosed can one obtain a concentrated blocked cone of control C while at the same time providing a wide area of unobstructed vision.

With regard to FIG. 2, this view is substantially the same as FIG. 1, except that the filters 3 and 4 have been moved slightly to the left of the eyes as shown on the sheet, to indicate the general relative position of the film screens with respect to the head of the operator of the vehicle as it is positioned in relation to the light rays being transmitted from an oncoming vehicle approaching in the left lane of a highway.

In the diagrammatic view of FIG. 3, there is shown an operator's head before which is positioned the improved lens glare control system and through which is drawn a double ended arrow denoted as L and R, depicting left and right. This is intended to indicate how the driver of a motor vehicle may shift his head slightly from left to right to quickly and easily accommodate his vision to the position of the cone of control C to create an opaque effect on the light beams B which emanate from the headlights of the oncoming car. The arrows pointing from right to left in the cone of control are to illustrate beams being protected by the oncoming vehicle, which is also clearly shown in FIG. 3.

In FIG. 4 there is shown an automobile windshield 20 in the left half or portion of which is depicted the rear of a driver's head 21, who is better shown in FIG. 5, as being equipped with the glare control device forming the basis of this invention. The glare screen, sometimes called a "sun-visor," which is customarily found on the modern automobile is indicated generally at 22, but in this instance it is provided with the improved filters 3 and 4, respectively. The glare screen may be supported from a depending arm that is suitably arranged or secured to a swivel joint 23 the upper arm 24 thereof being provided with a slidable clamp 25 of any suitable form that is positioned above and movable laterally of the windshield on trackway 26. If preferable, the "film screen" of this device may also be supported by the conventional sun-visor in the car. It will be readily appreciated that with ease and facility the vehicle operator may make himself comfortable and adjust the glare screen into any position such as shown in the diagrammatic views of FIGS. 2 and 3, in order to bring the headlights of the oncoming car into the cone of control area C.

In FIG. 5, there is shown a left profile view of the operator of the automobile as described in relation to FIG. 4 and in this particular view there is also shown in addition arrows 11 and 12, which form the border of the angle or cone of control C in a vertical direction.

In the group of figures denoted as 6a through 6h there are shown representative simplified forms of the polarizing film screens that are spaced at the required pupillary distance P. Accordingly, it is apparent from the teaching of this invention that all of these embodiments, 6a through 6h, must have the glare control plane of one-half substantially perpendicular to the glare control plane of the other half. This arrangement is clearly shown in FIGS. 6a and 6b. From carefully conducted experiments in connection with the teachings of this invention, it has been determined that the rectangular configuration of FIG. 6f is preferable. Accordingly, when the eyes of the operator of the vehicle are focused on a distant object, such as the oncoming lighted vehicle (FIG. 3), the blocking or opaque area appears as a single area 27 such as illustrated in FIG. 6f. Because of the positioning of the eye piece elements adjacent to the operator's eyes and the fact that the eyes are focused upon a distant subject through the filters 3 and 4, respectively, the binocularly fused area of coincidence of the element is created at substantially the opaque area 27 illustrated in FIG. 6f. Due to this fusion of vision the remaining area of the filters 3 and 4 are transparent and vision therethrough is not obstructed.

Figure 6G:
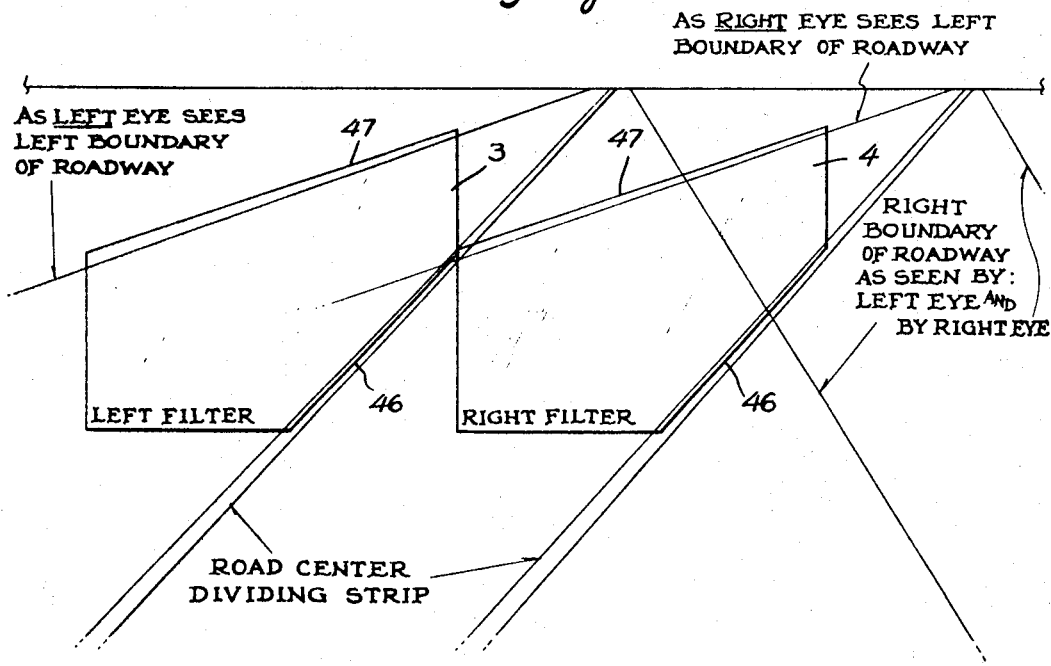
FIGS. 6g and 6h show another form of the invention wherein polygonal configurations of the film screens are disclosed.
Figure 6H:
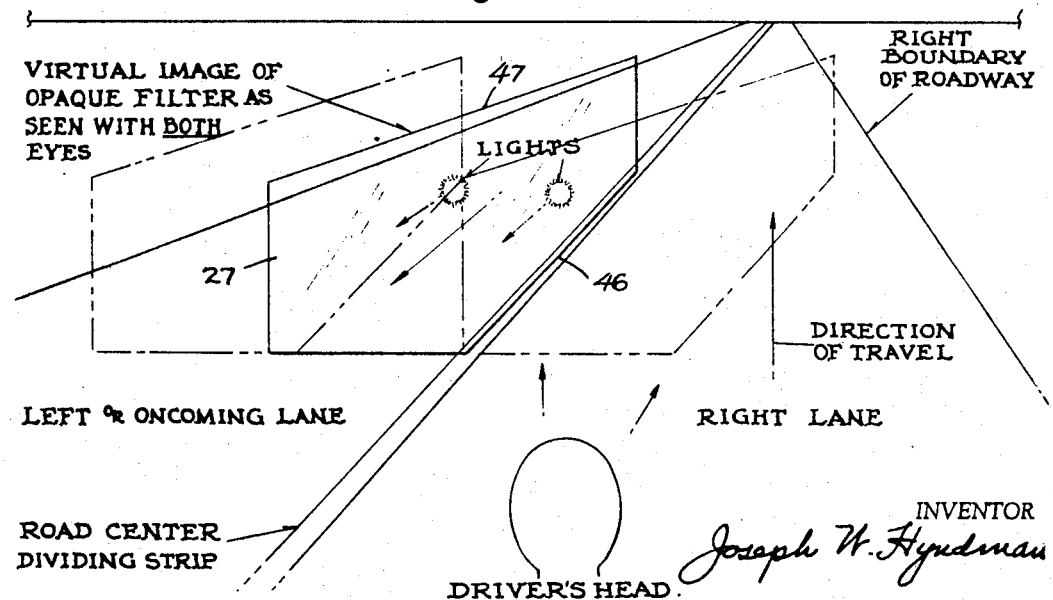

In FIGS. 6g and 6h there is shown a polygonal configuration for each filter screen wherein each of the screens has inclined edges 46, 47 which parallel the road center or strip and the left boundary of the roadway, respectively. It has been found that the edge 46 should be approximately 45° to the horizontal to best parallel the center portion of the roadway and the edge 47 should approximately be 30° to the horizontal in order to parallel the left boundary of the roadway. With this configuration the shape of each filter screen conforms substantially to the area defining the left lane of the roadway ahead of the automobile. The inclined edges 46, 47 need not line up exactly with the left hand lane edges of the roadway but rather the geometric shape as shown in FIG. 6g is designed to be a reasonably close approximation to the edges of the left lane and this approximation remains close regardless of the dividing strip between lanes as most commonly encountered on interstate highway systems. As previously stated, the driver has merely to shift his head to the right or to the left in order to resolve any disparity resulting from an improper alignment between the filter screens and the left lane of the roadway.

Turning again to FIG. 6g, the roadway is depicted as seen by the left eye in one instance and as seen by the right eye in another instance. FIG. 6h shows how both eyes view the filter screens and the roadway as a virtual image; thus, both filter screens 3 and 4 create a fused area of coincidence 27 as previously mentioned, and this area approximates the shape of the oncoming left hand lane of the roadway.

Should anyone prefer to use the various other embodiments of the filters disclosed in FIGS. 6a–6e, it will also be observed that because of the natural characteristics of vision becoming binocularly fused the same well accepted phenomenon will occur, that is, there will be an opaque medial area in the film screens bounded by adjacent transparent areas through which vision will be unobstructed.

FIG. 7 illustrates a conventional and well-known pair of polarized "snap-on" eyeglasses for use by those who have to wear eyeglasses and desire to reduce squinting in the sunlight to a minimum. It will be apparent that the lens attachment forming a part of this invention may take the form of any number of viewing means. For example, one's vision may be adequate without glasses and they will need to procure only a pair of suitable glasses including frames which have had the eye piece elements treated in accordance with the teaching of this invention. Or, they may wear corrective lens for deficiencies in vision that are also suitably polarized and preadjusted in accordance with this teaching. It will be observed in FIG. 7 that the cross-hatching lines are at right angles to each other in the respective eye piece elements which is indicative of the arrangement of the polarizing plane previously discussed relative to FIG. 1 through 3. In the form of the invention, illustrated in FIG. 8, which is still another embodiment, the cross-hatching is shown as being at right angles to each other but 45 degrees from the vertical. Of course, the film screen such as that illustrated in FIG. 6b would be suitable for use with the lens attachment illustrated in FIG. 8, as would that shown in FIG. 7, also be complementary to FIG. 6a.

In the drawing, FIG. 9 diagrammatically shows an airplane 30 being flown by a pilot depicted at 31. The pilot is shown wearing a pair of suitable eye piece elements 32, as taught by this disclosure. In front of the pilot there are positioned, at substantially arm's length, the filters 33 and 34. These may be, as mentioned hereinbefore, formed as a part of the windshield or as an attachment thereto. In this illustration, it is being assumed that the pilot is flying into the blinding glare of the sun S. The cross-hatching indicating the area of the cone of control is shown at 35 with the binocularly fused vision denoted at 36. In the air as well as on the ground the blinding effect of rays are screened without materially reducing the clear field of vision ahead.

FIG. 10 illustrates diagrammatically another use of the invention and in which there is shown a space capsule 40 moving above the earth, indicated generally at 41. The astronaut 42 riding within the capsule is equipped with the eye piece elements of this invention and the window 43 for simplicity is provided with the filter portion thereof, thereby suitably blocking out the objectionable rays 44 of the sun through the cone of control area indicated at 45. As in flying in an aircraft only the harmful rays will be blocked from view, but clear visibility will be otherwise assured of the surrounding area. The value of this inventive concept applied to this use is thought to be immediately apparent to those skilled in the art of space exploration.

It is believed that from the foregoing description of the invention that it will be apparent to those skilled in the art that the principles taught thereby can be applied to use on the land, sea or in the air as well as in outer space.

Various changes and modifications are considered to be within the principle of the invention and the scope of the following claims.

That which is claimed is:

1. An optical device to be used by an operator of a vehicle for visual observation of lighted areas and to reduce glare from bright lights, comprising a first pair of spaced polarizing elements in optical alignment including a first eye piece element and a first filter element, and a second pair of spaced polarizing elements in optical alignment including a second eye piece element and a second filter element, each of said first pair of elements having its axes of polarization perpendicular to that of the other, each of said second pair of elements having its axes of polarization perpendicular to that of the other, and each of said eye piece elements having its axis of polarization perpendicular to that of the other, said first and second eye piece elements being positioned adjacent to the eyes of said operator, and said first and second filter elements being attached to said vehicle in the line of vision of said operator, whereby the vision of said operator when looking directly ahead through said first and second pairs of spaced polarizing elements is obstructed and the peripheral vision of said operator encompassing the region to either side of said filter elements is unobstructed.

2. In a device according to claim 1, said first and second filter elements each have a polygonal perimeter for approximating the shape of the lighted areas to be observed.

3. The device according to claim 1 wherein each of said filter elements describes a five-sided polygon having two of its sides longer than the remaining sides, said two sides being spaced from and inclined to each other for approximating the shape of the lighted areas to be observed.

References Cited by the Examiner

UNITED STATES PATENTS 2,837,087  6/1958  Sawyer _____ 88—65 X

FOREIGN PATENTS 835,452  12/1951  Germany.

JEWELL H. PEDERSEN, *Primary Examiner.*

W. L. SIKES, *Assistant Examiner.*